Patented Aug. 7, 1945

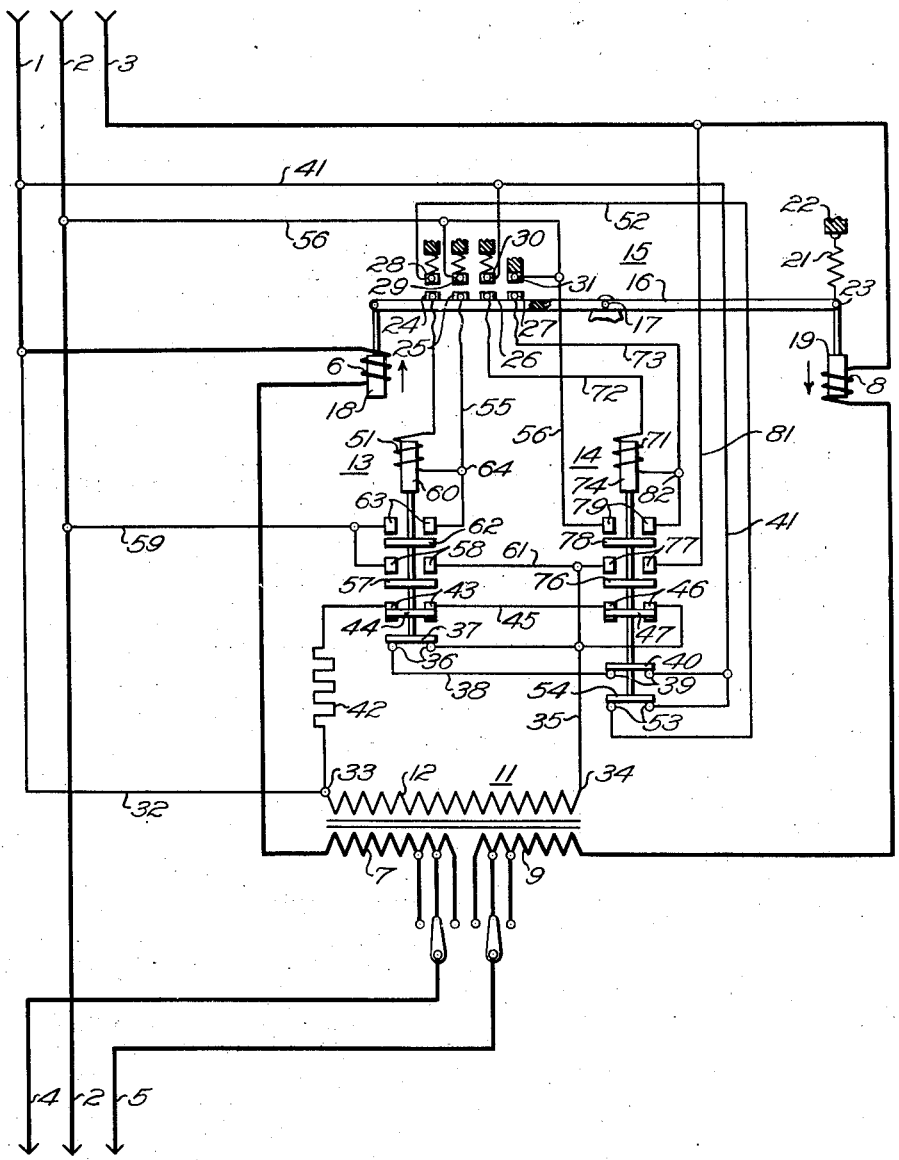

2,381,271

UNITED STATES PATENT OFFICE 2,381,271

BOOSTER REGULATOR

Frank H. Farmer, deceased, late of Hinsdale, Ill., by Millie Evelyn Farmer, executrix, Hinsdale, Ill., assignor to Westinghouse Electric Corporation, East Pittsburgh, Pa., a corporation of Pennsylvania Application July 20, 1943, Serial No. 495,423

7 Claims. (Cl. 171—119)

This invention relates to booster regulators for distribution circuits in which a transformer is employed for increasing the voltage of the distribution circuit as the load current in the circuit increases.

It is an object of the invention to provide a regulating transformer for use on single-phase alternating-current circuits for controlling the distribution circuit voltage by boosting the voltage across transformer secondary windings that are permanently connected in series with the circuit conductors.

Other objects and advantages of the invention will be apparent from the following description of a preferred embodiment thereof, in which the single figure is a diagrammatic view of circuits and apparatus organized in accordance with the invention.

In the drawing, supply circuit conductors 1, 2 and 3 represent a three-wire, single-phase alternating current source of energy for supplying a load through circuit conductors 4, 2 and 5, the conductors 4 and 5 being on the output side of the regulating equipment and the conductor 2 being continuous from the source to the load. The conductors 1, 2 and 3 comprise a three-wire circuit having, say 120 volts between conductors 1 and 2, and 2 and 3, and 240 volts between conductors 1 and 3, a solenoid winding 6 and a series transformer winding 7 and the conductor 3 is similarly connected to the conductor 5 through a solenoid winding 8 and a secondary or series transformer winding 9. The boosting transformer 11 includes, in addition to the series connected secondary windings 7 and 9, a primary or exciting winding 12 inductively related to the secondary windings 7 and 9. The control of the exciting winding 12 is effected by means of interlocking relays 13 and 14, the operation of which is controlled by a primary control element 15 comprising a rocker arm or beam 16 pivotally mounted on a pivot pin 17 and actuated by armatures 18 and 19 connected thereto and associated respectively, with the control solenoids 6 and 8, which together operate to move the beam 16 in a clockwise direction against the bias of a spring 21, one end of which is attached to an abutment 22, and the other end of which is attached to the beam 16 by means of the pivot pin 23. The beam 16 carries a plurality of contact members 24, 25, 26 and 27 which are shown in spaced relation to cooperating contact members 28, 29, 30 and 31 respectively, so as to close circuits through the cooperating pairs of contact members in sequence as the beam 16 moves in a clockwise direction.

In the illustrated position of the beam 16, the relays 13 and 14 are both in their deenergized positions and the exciting winding 12 is short circuited through a circuit extending from line conductor 1 through conductor 32 to the winding terminal 33 and from the opposite winding terminal 34, through conductor 35, contact members 36 and 37 of the relay 13, conductor 38, contact members 39 and 40 of the relay 14, and conductor 41 to line conductor 1. A circuit is also closed between winding terminals 33 and 34 which includes a resistor 42, contact members 43 and 44 of relay 13, conductor 45, contact members 46 and 47 of relay 14, and conductor 35 to the terminal 34.

For load currents up to a predetermined value, say, 70% of the rated load current of the apparatus, the beam 16 will not have moved sufficiently in a clockwise direction, under the influence of the solenoids 6 and 8, to effect operation of the relays 13 and 14. As the load current increases, however, the movement of the beam 16 by the plungers 18 and 19 that are responsive to the currents flowing in the solenoid windings 6 and 8 respectively, causes engagement between the contact members 24 and 28 to connect one side of the operating winding 51 of the relay 13 to line conductor 1 through a circuit including the contact members 24 and 28, conductor 52, the contact members 53 and 54 of relay 14 and conductor 41. Upon a slight further movement of the rocker arm 16 in a clockwise direction contact members 25 and 29 are brought into engagement closing a circuit from the other terminal of the relay operating winding 51 through conductor 55, contact members 25 and 29, and conductor 56 to conductor 2, thus connecting the winding 51 across conductors 1 and 2 for energizing it to effect an upward movement of the associated armature 60 and movable contact members. As the armature 60 starts its upward movement, the short circuit through relay contact members 36 and 37 previously traced is interrupted, and, upon a slight further upward movement of the relay the contact member 57 bridges the contact members 58 to close a circuit extending from line conductor 2 through branch conductor 59, relay contact members 57 and 58, conductors 61 and 35 to the terminal 34 of winding 12, the opposite terminal 33 being connected through conductor 32 to line conductor 1. This circuit places the voltage between line conductors 1 and 2, say, 120 volts, across the exciting winding 12. At the moment that the above traced circuit for energizing the exciting winding is completed, the circuit through the resistor 42 above traced is still intact. This resistor eliminates the need for opening the exciting winding during transition periods from one circuit connection to another, which if done, would result in excessive momentary drops of secondary voltage due to inserting a series reactance in the line. It also provides a circuit for the dissipation of energy which would otherwise appear as sparking across the switch contacts during the transition period from one circuit connection to another. At the same time that the contact member 57 bridges the contact member 58, a contact member 62 bridges the contact member 63 to connect the terminal 64 of the operating winding 51 to the line conductor 2 through conductor 59 which is independent of the initial connection between these two points through the contact members 25 and 29 as effected by movement of the rocker arm 16. This holding circuit is provided so that the relay 13 will not be deenergized upon slight movements of the rocker arm 16 in a counter-clockwise direction which are insufficient to interrupt the circuit through the contact members 24 and 28.

As the upward movement of the relay 13 is completed, the contact member 44 separates from the contact members 43 to interrupt the circuit through the resistor 42 in shunt with the exciting winding 12, thus completing the first operating step of the booster regulator.

Upon the interruption of the short circuit of the exciting winding 12 and the connection of this winding to the 120-volt source between conductors 1 and 2, a predetermined boost in the voltage across the series secondary windings 7 and 8 is introduced, thus increasing the output voltage between conductors 4, 2 and 5. If the line current decreases while the relay 13 is in its energized or circuit closing position, so as to interrupt the circuit through the contact members 24 and 28 and deenergize the operating winding 51, the several circuit changes controlled by relay 13 will take place in the reverse order from that above described for the relay while moving to its energized position. That is to say, the contact member 44 will first bridge the contact members 43 connecting the resistor 42 in shunt to the exciting winding 12, the contact members 57 and 62 will next separate from the contact members 58 and 63, respectively disconnecting the exciting winding 12 from the primary circuit conductor 2 after which the contact member 37 will engage contact members 36, again completing the short circuit between the terminals of the exciting winding 12.

If, after the relay 13 has been operated to its energized position, the load current continues to increase, the rocker arm 16 will move in a clockwise direction until contact member 26 engages the contact member 30, thus connecting one terminal of the operating winding 71 of the relay 14 through conductor 72, contact members 26 and 30 and conductor 41 to the line conductor 1. Upon slight further movement of the rocker arm 16 in the same direction, the contact member 27 engages the contact member 31 thus connecting the other terminal of the winding 71 through conductor 73, contact members 27 and 31 and conductor 56 to line conductor 2, thus energizing the relay operating winding 71 to cause its armature 74 to move upwardly for actuating the several movable contact members connected thereto.

Upon the initial upward movement of the armature 74 the contact members 40 and 54 are separated from contact members 39 and 53, respectively. The separation of contact members 54 and 53 interrupts the above traced circuit through contact members 28 and 24 on the rocker arm 16 to the operating winding 51 of the relay 13, thus deenergizing this relay and permitting it to drop to its lower or illustrated circuit position. The separation of contact member 40 from the contact members 39 interrupts the above traced short circuit between terminals 33 and 34 of the exciting winding 12 that would otherwise be completed upon engagement of the contact member 37 of the relay 13 with the contact members 36, thus preventing the completion of this short circuit between the first step and the second step of voltage boost introduced under the control of relays 13 and 14, respectively. Upon a slight further upward movement of the armature 74, the relay contact member 76 bridges the contact members 77 and the contact member 78 bridges the contact members 79. The contact member 76 thus completes a circuit between the exciting winding terminal 34 through conductor 81 to circuit conductor 3 to connect the exciting winding 12 between conductors 1 and 3, and to apply a voltage of, say, 240 volts thereacross to effect an increased boost in the voltage introduced by windings 7 and 9 in the output circuit comprising conductors 4, 2 and 5. The engagement of the contact members 78 with the contact members 79 closes a circuit between the terminal 82 of the relay operating winding 71 through conductor 56 to circuit conductor 2 in shunt relation to that initially closed through contact members 27 and 31, so that the relay operating winding 71 will not be deenergized until the rocker arm 16 has moved in a counter-clockwise direction sufficiently to separate the contact members 26 and 30. Upon a slight further upward movement of the armature 74, the contact member 47 will separate from contact members 46 to interrupt the circuit through the resistor 42 in shunt to the exciting winding 12, thus completing the second booster step of operation of the apparatus.

Upon a decrease in the load current through the windings 6 and 8, the rocking arm 16 moves in a counter-clockwise direction, and, when moved sufficiently causes separation of contacts 26 and 30, the winding 71 of the relay 14 will be deenergized, permitting it to drop to its lower or illustrated position. In the movement to its lower position, the contact 47 will first bridge contacts 46 to close a circuit through the resistor 42 in shunt relation to the exciting winding 12; then contact members 76 and 78 will separate from engagement with the bridging contact members 77 and 79 respectively, the contact member 76 thus interrupting the energizing circuit between the terminal 34 and the circuit conductor 3. The contact member 54 will then bridge contact members 53 to complete a circuit as above traced, through contact members 28 and 24 controlled by the rocker arm 16 to energize the operating winding 51 of the relay 13, causing it to operate as before described to connect the exciting winding 12 between conductors 1 and 2 to effect application of the lower of the two boosting voltages to this winding. The contact member 40 will engage the contact members 39 after relay 13 has started to operate and move sufficiently to effect separation between contact members 37 and 36. The deenergization of the relay 14 and the pickup of the relay 13 has thus disconnected the exciting winding 12 from conductors 1 and 3 between which the voltage is, say, 240 volts, and connects the exciting winding across conductors 1 and 2 between which the impressed voltage is, say 120 volts. Correspondingly, the output or boosting voltage of the windings 7 and 9 has been decreased from the maximum value to approximately half of that value.

The apparatus is so adjusted that the relay 13 may operate to effect one stage of boost at, say, 70% full load current on the transformer and the second relay 14 to provide a second stage of boost when the current is at some value such as 130% normal load. The second stage of boost will, therefore, operate only at infrequent intervals when the circuit is operating at a very high load.

It will be apparent to those skilled in the art that modifications in the circuits and apparatus described may be made within the spirit of the invention, and it is not wished to be limited otherwise than by the scope of the appended claims.

What is claimed is:

1. In combination, a single-phase, three conductor alternating-current circuit, a regulating transformer having series windings connected respectively in two conductors of said circuit and an exciting winding inductively related thereto, switch means for selectively short circuiting said exciting winding, for connecting said exciting winding across two of said three circuit conductors to apply a predetermined energization thereto and across another two of said three circuit conductors for applying a different predetermined energization thereto, and means responsive to the current flow in said two conductors for controlling the operation of said switch means.

2. In combination, a single phase, three conductor alternating-current circuit, a regulating transformer having series windings connected respectively in two conductors of said circuit and an exciting winding inductively related thereto, means responsive to the current flow in said two conductors for selectively short circuiting said exciting winding, and connecting said exciting winding across two of said three circuit conductors for applying a predetermined energization thereto and across another two of said three circuit conductors for applying a different predetermined energization thereto.

3. In combination, a single-phase, three conductor alternating-current circuit, a regulating transformer having series windings connected respectively in two conductors of said circuit and an exciting winding inductively related thereto, switch means having an operating position for short circuiting said exciting winding and an operating position for connecting said exciting winding to said circuit, a resistor, said switch means having contacts for connecting said resistor across the terminals of said exciting winding when the switch means is in the first of said two positions and for interrupting said circuit after movement of said switch means from said first position to a position to close the circuit for connecting said exciting winding across the said circuit conductors.

4. In combination, a single-phase, three conductor alternating-current circuit, a regulating transformer having series windings connected respectively in the two outer conductors of said circuit and an exciting winding inductively related thereto, means for controlling the energization of said exciting winding comprising a pair of electrically operated switches for selectively connecting said winding to said circuit conductors for effecting different degrees of energization thereof, and means for controlling the operation of said electrically operated switches comprising a movable member actuated in accordance with the flow of current in said three conductor circuit and having two sequentially operated circuit closing means associated with each switch and connected for controlling an operating circuit therefor, means operable upon the energization of said operating circuit for establishing a holding circuit in shunt relation to the second one of said two sequentially operated circuit closing means to close for retaining the operating circuit closed until the first of said two circuit closing means to close is opened.

5. In combination, a single-phase, three-conductor alternating-current circuit, a regulating transformer having series windings connected respectively in two conductors of said circuit and an exciting winding inductively related thereto, switch means for connecting said exciting winding across two of said three circuit conductors to apply a predetermined energization thereto and across another two of said three circuit conductors for applying a different predetermined energization thereto, and means responsive to an electrical condition of the circuit for controlling the operation of said switch means.

6. In combination, a single-phase, three conductor alternating-current circuit, a regulating transformer having series windings connected respectively in two conductors of said circuit and an exciting winding inductively related thereto, switch means for connecting said exciting winding between one of the two conductors having a series winding connected therein and the third one of the three circuit conductors to apply a predetermined energization thereto in response to a predetermined decrease in the value of an electrical characteristic of the circuit and for connecting said exciting winding between the two conductors having series winding connected therein to apply a greater predetermined energization thereto upon a greater decrease in the value of said electrical characteristic of the circuit.

7. In combination, a single phase, three conductor alternating-current circuit, a regulating transformer having series windings connected respectively in the two outer conductors of said circuit and an exciting winding inductively related thereto, means responsive to an electrical condition of said circuit for selectively short circuiting said exciting winding, and connecting said exciting winding across two of said circuit conductors for applying a predetermined energization thereto and across another two of said circuit conductors for applying a different predetermined energization thereto.

MILLIE EVELYN FARMER,
*Administratrix of the Estate of Frank H. Farmer, Deceased.*